United States Patent [19]

Lee

[11] Patent Number: 5,239,245
[45] Date of Patent: Aug. 24, 1993

[54] METHOD OF CONTROLLING ROTATIONAL SPEEDS AND PHASES OF A DRUM MOTOR AND A CAPSTAN MOTOR IN A VCR

[75] Inventor: Hong S. Lee, Suwon, Rep. of Korea

[73] Assignee: Gold Star Co., Ltd., Seoul, Rep. of Korea

[21] Appl. No.: 718,636

[22] Filed: Jun. 21, 1991

[30] Foreign Application Priority Data

Jun. 21, 1990 [KR] Rep. of Korea ............... 9134/1990

[51] Int. Cl.$^5$ .............................................. H02P 5/50
[52] U.S. Cl. ...................................... 318/567; 318/67; 360/73.01; 388/812
[58] Field of Search .................. 318/34, 66, 67, 68, 318/567, 606, 607, 608, 615, 616, 617, 618, 671; 388/805, 812, 813, 820; 360/73.01

[56] References Cited

U.S. PATENT DOCUMENTS

| | | | |
|---|---|---|---|
| 4,341,363 | 7/1982 | Inatome | 242/189 |
| 4,785,950 | 1/1989 | Ota et al. | 318/314 |
| 4,841,213 | 6/1989 | Tomasek | 318/661 |
| 4,847,555 | 7/1989 | Stammer et al. | 318/254 X |
| 4,864,200 | 9/1989 | Kohsaka | 388/812 |
| 4,885,793 | 12/1989 | Tabuchi | 388/810 |
| 4,914,361 | 4/1990 | Tajima et al. | 318/254 |
| 4,980,617 | 12/1990 | Tajima et al. | 318/254 |
| 4,994,723 | 2/1991 | Tabuchi | 318/569 |
| 5,012,358 | 4/1991 | Kohsaka | 360/70 |
| 5,023,924 | 6/1991 | Tajima et al. | 388/811 |

Primary Examiner—Bentsu Ro
Attorney, Agent, or Firm—Fish & Richardson

[57] ABSTRACT

A method of controlling the rotational speeds and phases of drum and capstan motors forming part of a servo system in a VCR by detecting signals that correspond to current rotational speeds and phases of the motors, and controlling the rotational speeds and phases of the motors by using the detected signals in rotational speed control and phase control routines. The speed control routine applys the steps of: inputting current rotational speed signals; producing rotational speed control signals corresponding to a rotational speed error signal; applying the produced rotational speed control signals to the drum and capstan motors to control their rotational speeds, performing a compensating operation necessary to the servo system, and then completing the rotational speed control routine. The phase control routine applys the steps of: inputting the current phase signals; producing phase control signals corresponding to phase error signals; applying the produced phase control signals to the drum and capstan motors to control their phases, performing a compensating operation necessary to said servo system, and then completing the rotational speed control routine. The servo system according to the present method can embody through described software much of the hardware construction of conventional VCRs, such software construction resulting in a less costly and more compact servo system.

5 Claims, 6 Drawing Sheets

METHOD OF CONTROLLING ROTATIONAL SPEEDS AND PHASES OF A DRUM MOTOR AND A CAPSTAN MOTOR IN A VCR

BACKGROUND OF THE INVENTION

1. Field of the Invention

The present invention relates in general to a method of controlling the rotational speed and phrase of a motor, and more particularly, to a method of controlling by use of software, operations of a drum motor employed in a Video Cassette Recorder (VCR).

2. Description of the Prior Art

Generally, a servo system is employed in apparatus requiring a precise control. One embodiment of a conventional servo system for providing such precise control will hereinafter be described with reference to FIG. 1.

The block diagram of FIG. 1 shows the construction of a conventional servo system for controlling rotational speeds and phrases of a capstan motor and a drum motor employed in a VCR. As shown in the drawing, the conventional servo system comprises a motor M, a phase control circuit 100, and a rotational speed control circuit 200.

Phase control circuit 100 includes a first amplifier 31 for amplifying a phase signal outputted from motor M by a predetermined amount of amplification, and a phrase error detector 32 for detecting the phase difference between a predetermined reference phase signal and the phase of an output signal from the first amplifier, and generating a phase error voltage in accordance with the detected phase difference.

Rotational speed control circuit 200 is provided with a frequency generator 33 for detecting a rotational speed of the motor M and generating a frequency signal in accordance with the detected rotational speed, a second amplifier 34 for amplifying the output signal from frequency generator 33 by a predetermined amount of amplification, and a rotational speed error detector 35 for generating a rotational speed error voltage in response to the output signal from second amplifier 34.

Also, the conventional servo system comprises an adder 36 for adding an output signal from the phase error detector 32 to an output signal from the rotational speed error detector 35, a compensating circuit 37 for inputting an output signal from adder 36 and processing the inputted signal to enhance the performance of the servo system, and a third amplifier 38 for amplifying an output signal from the compensating circuit 37 by a predetermined amplification amount to generate a control signal and applying the control signal to the motor M. The motor servo-operates based on the control signal from third amplifier 38.

N pole and S pole magnetic elements 39 and 39a are mounted on both sides of motor M to detect the phase signal from the motor inputted to first amplifier 31. Thus, as the motor rotates, the N pole and S pole magnetic elements 39 and 39a rotate together with the motor, thereby producing a magnetic variation. A pulse generator (not shown) generates a pulse signal in accordance with such magnetic variation. This very low pulse signal is amplified to a recognizable level by first amplifier 31.

In a conventional VCR system, a vertical synchronous signal in a composite video signal, with the frequency divided by ½ by a frequency divider (not shown), has been typically used as the reference phase signal, but with different values possibly used in accordance with the particular capstan motor or drum motor. Also, different values may be used depending on whether the unit is operating in the recording mode or the playback mode.

Compensating circuit 37 usually employed in the control system serves to increase a DC gain to compensate for the steady state error and a load suppression characteristic, and/or is adapted to filter a signal inputted therein to remove external noise and distortion components. Therefore, compensating circuit 37 has various different constructions depending on the control system, and the circuit usually includes an operational amplifier with an external resistor and capacitor.

The operation of the conventional servo system with the above-mentioned construction will now be described.

First, upon receiving a phase signal from motor M and a reference phase signal, phase error detector 32 in phase control circuit 100 detects the phase difference between the reference phase signal and the phase signal from the motor and generates a phase error voltage in accordance with the detected phase difference.

On the other hand, frequency generator 33 in the rotational speed control circuit 200 generates a frequency signal in accordance with the number of rotations of motor M. This very low frequency signal is amplified by second amplifier 34 by a predetermined amplification degree or amount. Rotational speed error detector 35 generates a rotational speed error voltage in response to the output signal from second amplifier 34.

Then, adder 36 adds the phase error voltage from phase error detector 32 to the rotational speed error voltage from rotational speed error detector 35 and outputs the added value to compensating circuit 37. Compensating circuit 37 either filters the signal inputted therein or increases the DC gain to enhance the performance of the servo system. Third amplifier 38 amplifies the output signal from compensating circuit 37 by such a predetermined amplification amount that the motor can recognize the signal, and delivers the amplified signal as a control signal to motor M.

However, the conventional servo system has the following primary disadvantages:

Because the phase error detector, the rotational speed error detector and the compensating circuit are designed in terms of their hardware, their characteristics are almost always fixed.

In addition, the VCR is made of a similar complex hardware construction in order to correspond to such circuits and various playback conditions such as, for example, a normal playback, a speed change playback and the like. Therefore, due to these many limited features in the servo system design, the system performance is degraded and limited.

SUMMARY OF THE INVENTION

Therefore, it is an object of the present invention to use software to provide a method of controlling the rotational speed and phase of a motor by means of detected rotational speed and phase data.

In accordance with one aspect of the present invention, in a servo system for detecting signals corresponding to current rotational speeds and to phases of a drum motor and of a capstan motor, respectively, in a VCR and controlling phases of the drum motor and the capstan motor by using the detected signals, there is provided a method for controlling the phases of the drum motor and the capstan motor in the VCR comprising the steps of:

(a) inputting set reference phase signals and current phase signals corresponding to the current phases of the drum motor and the capstan motor, respectively;

(b) checking whether the current rotational speeds of the drum motor and the capstan motor are within set reference rotational speed limits; and (c1) if the current rotational speeds of the drum motor and the capstan motor are within the set reference rotational speed limits, obtaining phase differences in the form of phase difference signals between the set reference phase signals and the current phase signals, checking to see which one (or ones) of a plurality of set phase difference signal limits the phase difference signals correspond to, and outputting a phase error signal in accordance with the checked results; or (c2) if the current rotational speeds of the drum motor and the capstan motor are beyond the set reference rotational speed limits, outputting a set constant phase error signal; and (d) producing phase control signals corresponding to the phase error signals, applying the produced phase control signals to the drum motor and the capstan motor to control their phases, then performing a compensating operation necessary to the servo system, and completing the phase control routine.

In accordance with another aspect of the present invention, in a servo system for detecting signals corresponding to current rotational speeds and phases of a drum motor and a capstan motor in a VCR, respectively, and controlling rotational speeds of the drum motor and the capstan motor by using the detected signals, there is provided a method of controlling the rotational speeds of the drum motor and the capstan motor in the VCR comprising the steps of:

(a) inputting current rotational speed signals corresponding to the current rotational speeds of the drum motor and the capstan motor;

(b) checking that the current rotational speeds of the drum motor and the capstan motor correspond to which one of a plurality of set rotational speed limits, and outputting a rotational speed error signal in accordance with the checked results; and (c) producing rotational speed control signals corresponding to the rotational speed error signal, applying the produced rotational speed control signals to the drum motor and the capstan motor' to control their rotational speeds, then performing a compensating operation necessary to the servo system, and completing the rotational speed control routine.

BRIEF DESCRIPTION OF THE DRAWINGS

The above and other objects, features and advantages of the present invitation will be more clearly understood from the following detailed description taken in conjunction with the accompanying drawings, in which.

DETAILED DESCRIPTION OF THE PREFERRED EMBODIMENTS

First, an embodiment of a servo system for performing a method of controlling rotational speeds and phases of a capstan motor and a drum motor in a VCR in accordance with the present invention will be described.

Figure 2:
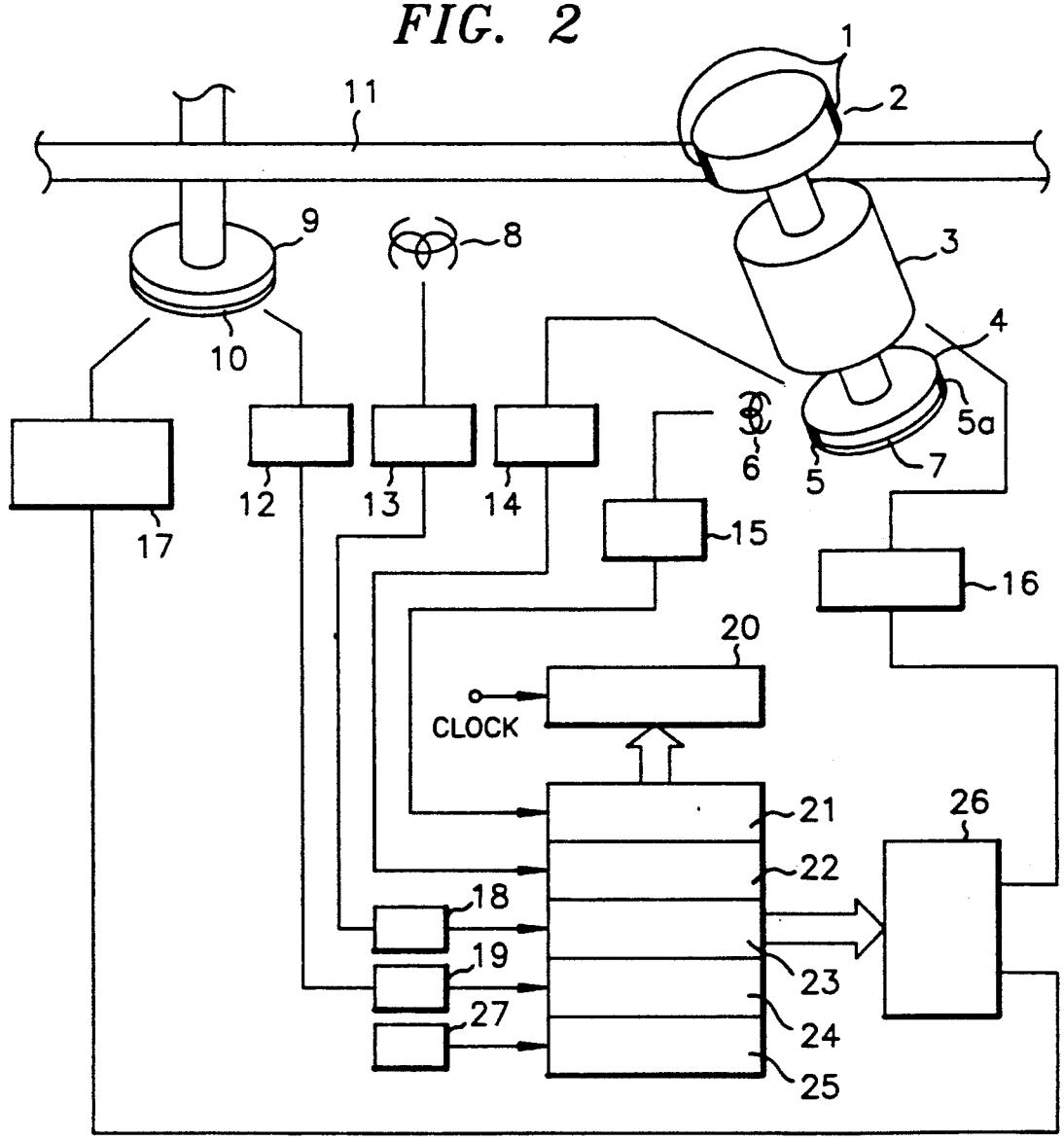
FIG. 2 is a block diagram showing the construction of a servo system for performing a method of controlling rotational speeds and phases of the capstan motor and the drum motor in accordance with the present invention.

Referring to FIG. 2, the servo system for carrying out the method according to the present invention is shown to comprise a drum motor 3;

an upper drum 2 being rotated by the drum motor 3;

a video head 1 disposed on upper drum 2 for recording and playing back a video signal;

a rotator 4 being rotated with upper drum 2 by drum motor 3;

N pole and S pole magnetic elements 5 and 5a disposed on rotator 4 for detecting a rotational position of the video head 1;

a pulse generating head 6 for detecting rotational positions of N pole and S pole magnetic elements 5 and 5a and generating a predetermined pulse in accordance with the detected rotational positions;

a first frequency generator 7 disposed on rotator for detecting the number of rotations of drum motor 3, and generating a fine frequency signal in accordance with the detected number of rotations;

a VCR tape 11 for recording and playing back the video signal;

a control head 8 for recording and playing back a control pulse of a phase control signal for VCR tape 11;

a capstan motor 9 for forwarding the VCR tape 11;

a second frequency generator 10 for detecting the number of rotations of capstan motor 9 and generating a fine frequency signal in accordance with the detected number of rotations;

first to fourth amplifiers 12 to 15 adapted for amplifying fine output signals from second frequency generator 10, control head 8, first frequency generator 7 and pulse generating head 6, respectively, by a predetermined degree of amplification;

first and a second driving circuits 16 and 17 adapted for driving drum motor 3 and capstan motor 9, respectively, in accordance with control signals inputted thereto;

a second frequency divider 19 for frequency-dividing an output signal from first amplifier 12, which amplifies the output signal from second frequency generator 10 by a predetermined degree of amplification and by a preselected frequency dividing ratio determined in accordance with each playback mode, such as slow play (SP), long play (LP) and extended play (EP), and each speed change mode, such as Fast/Forward, Rewind, etc.;

a first frequency divider 18 for frequency dividing an output signal from second amplifier 13, which amplifies the output signal from control head 8 by a predetermined degree of amplification and by a preselected frequency dividing ratio determined in accordance with each playback mode and each speed change mode as mentioned above;

a free run counter 20 for oscillating freely without synchronization with any signal;

a reference signal generator 27 for generating a reference phase signal according to whether a function mode is set for either the playback mode or the recording mode and/or whether capstan motor 9 or drum motor 3 is being controlled;

first to fifth registers 21 and 25 each connected to free run counter 20 for receiving output signals from third and fourth amplifiers 14 and 15, from first and second frequency dividers 18 and 19, and from reference signal generator 27, each as a trigger signal; and a CPU 26 adapted for performing a control function of the servo system by means of a predetermined program contained therein.

Upon receiving a corresponding trigger signal, the first to fifth registers 21–25 each loads and latches an output signal from free run counter 20 corresponding to the corresponding trigger signal, and outputs an interrupt signal to CPU 26. This interrupt signal allows CPU 26 to perform an interrupt routine.

Figure 1:
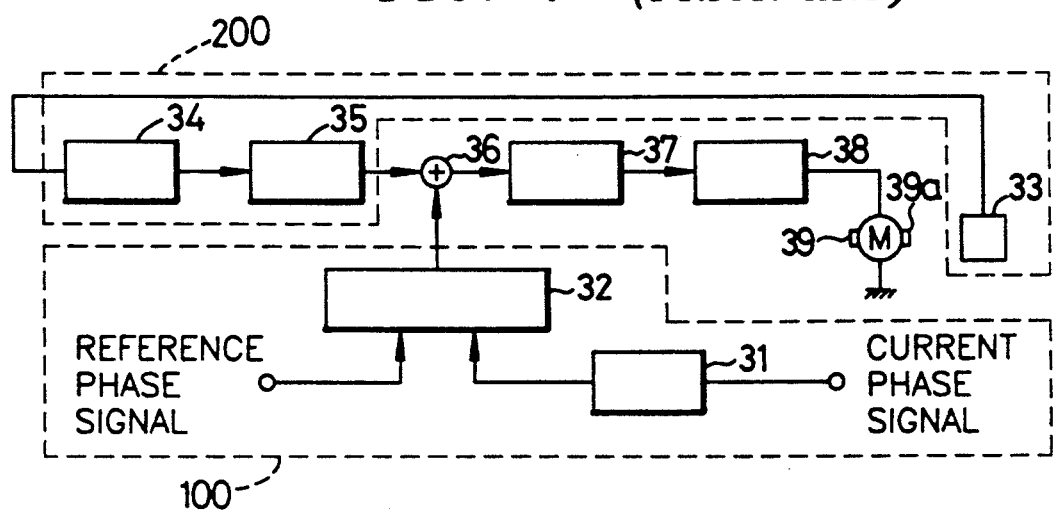
FIG. 1 is a block diagram showing the construction of a conventional servo system for controlling rotational speeds and phases of a capstan motor and a drum motor employed in a VCR.

Herein, CPU 26 is adapted to perform software functions of phase error detector 32, rotational speed error detector 35 and compensating circuit 37 in the conventional construction as shown in FIG. 1.

Next, the method of controlling rotational speeds and phases of the capstan motor and the drum motor in accordance with the present invention by employing the above-mentioned construction will be described in detail.

Typically, rotation of video head 1 must be accurately synchronized with a screen scanning, that is, an upper portion of the screen beginning with a vertical scanning has to be matched with a portion of video head 1 beginning with a spiral scanning, or a portion of video head 1 initially contacted with the VCR tape, so that a video signal can be recorded.

Also, upon rotation of video head 1, its rotational position in the playback mode must be in accord with that in the recording mode.

Therefore, the servo system functions to synchronize rotations of heads with each other as stated above.

First, the procedure for controlling the rotational speed of drum motor 3 will be described.

The output signal from first frequency generator 7 is used for control of the rotational speed of drum motor 3. This output signal from first frequency generator 7, representing the current rotational speed value of drum motor 3, is amplified by third amplifier 14 which applies the amplified signal as a trigger signal to second register 22. Upon receiving the output signal from third amplifier 14, second register 20 latches the counted value from free run counter 20 and allows CPU 26 to perform an interrupt routine for control of the rotational speed of drum motor 3. CPU 26 performs the rotational speed control procedure as represented by the flowchart shown in FIGS. 5 and 5a in order to control the rotational speed of drum motor 3. The rotational speed control procedure will be described in detail later.

Next, the procedure for controlling the phase of drum motor 3 will be described.

The output signal from pulse generating head 6 is used for control of the phase of drum motor 3. This output signal from pulse generating head 6 representing the current phase value of drum motor 3 is amplified by fourth amplifier 15, which applies the amplified signal as the trigger signal to first register 21. Upon receiving the output signal from fourth amplifier 15, first register 21 latches the counted value from free run counter 20 and allows CPU 26 to perform an interrupt routine for control of the phase of drum motor 3 as represented by the flowchart shown in FIGS. 6 and 6a. The phase control procedure will be presented in detail later.

Capstan motor 9 can also be controlled in a similar manner as that of drum motor 3 as above described. First, the procedure for controlling the rotational speed of the capstan motor 9 will be described.

Second frequency generator 10 outputs a frequency signal in accordance with the current rotational speed of capstan motor 9. This frequency signal from second frequency generator 10 is amplified by first amplifier 12 which applies the amplified signal to second frequency divider 19, in which the frequency dividing ratio is determined depending on the playback modes. Second frequency divider 19 converts the inputted amplified signal into a signal adequate to provide control of the rotational speed, and applies the converted signal as the trigger signal to fourth register 24. Then, CPU 26 performs an interrupt routine for control of the rotational speed of capstan motor 9 in a similar manner to that of drum motor 3.

Next, the procedure for controlling the phase of the capstan motor will be described.

The control signal from VCR tape 11 played back by control head 8 is amplified by second amplifier 13 which applies the amplified signal to first frequency divider 18. First frequency divider 18 frequency-divides the inputted amplified signal by the frequency dividing ratio determined depending on the playback modes, and applies the frequency-divided signal to third register 23. Then, CPU 26 performs an interrupt routine for control of the phase of capstan motor 9 in a similar manner to that of drum motor 3.

For the control of the phase of drum motor 3, reference signal generator 27 is adapted to provide reference phase signals different from each other for the recording and the playback modes. Namely, reference signal generator 27 applies a vertical synchronous signal in a video signal inputted therein as the reference phase to fifth register 25 for the recording mode, and a control signal with a predetermined frequency as the reference phase signal to fifth register 25 for the playback mode. For playback mode, fifth register 25 loads as the reference phase signal the counted value from free run counter 20 corresponding to the predetermined frequency.

Each of rotational speed and phase control signals for capstan motor 9 and drum motor 3 processed by CPU 26 through the rotational speed and phase controlling procedures as above-mentioned are applied to capstan motor 9 and drum motor 3 via first and second driving circuits 16, 17 to control their rotational speeds and phases.

Now, the rotational speed and phase controlling procedures will be mentioned in detail with reference to the flowcharts of FIGS. 5, 5a, 6 and 6a.

First, the procedure controlling the rotational speeds of capstan motor 9 and drum motor 3 will be described in detail.

Figure 3:
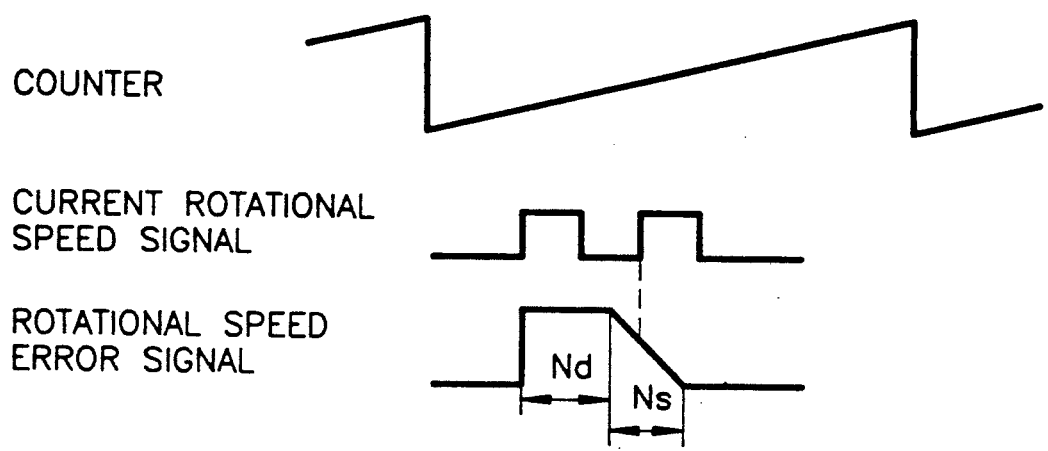
FIG. 3 shows system operation waveforms under the control of the rotational speed according to the present invention.

FIG. 3 shows waveforms from respective components in FIG. 2 for control of the rotational speeds.

When the current rotational speed signals generated by first and second frequency generators 7 and 10 are within the set frequency limits, a normal rotational speed error signal proportional to the current rotational speeds is generated; when the current rotational speed signals are beyond the set frequency limits, a fixed, constant rotational speed error signal is generated. In FIG. 3, the set frequency limits are represented as Nd and Nd+Ns. When the rotational speeds of drum motor 3 and capstan motor 9 are faster than the set reference rotational speed, periods of the current rotational speed signals are shortened, and a rotational speed error signal with the maximum value is generated. On the other hand, when the rotational speeds of drum motor 3 and capstan motor 9 are slower than the set reference rotational speed, periods of the current rotational speed signals are lengthened, and a rotational speed error signal with the minimum value is generated. When the rotational speeds of the drum motor and the capstan motor are within the set reference rotational speed limits, the rotational speed error signal proportioned to the current rotational speeds is generated. Herein, the frequencies of signals Nd and Nd+Ns may be set in every way in accordance with various playback modes.

Figure 5:
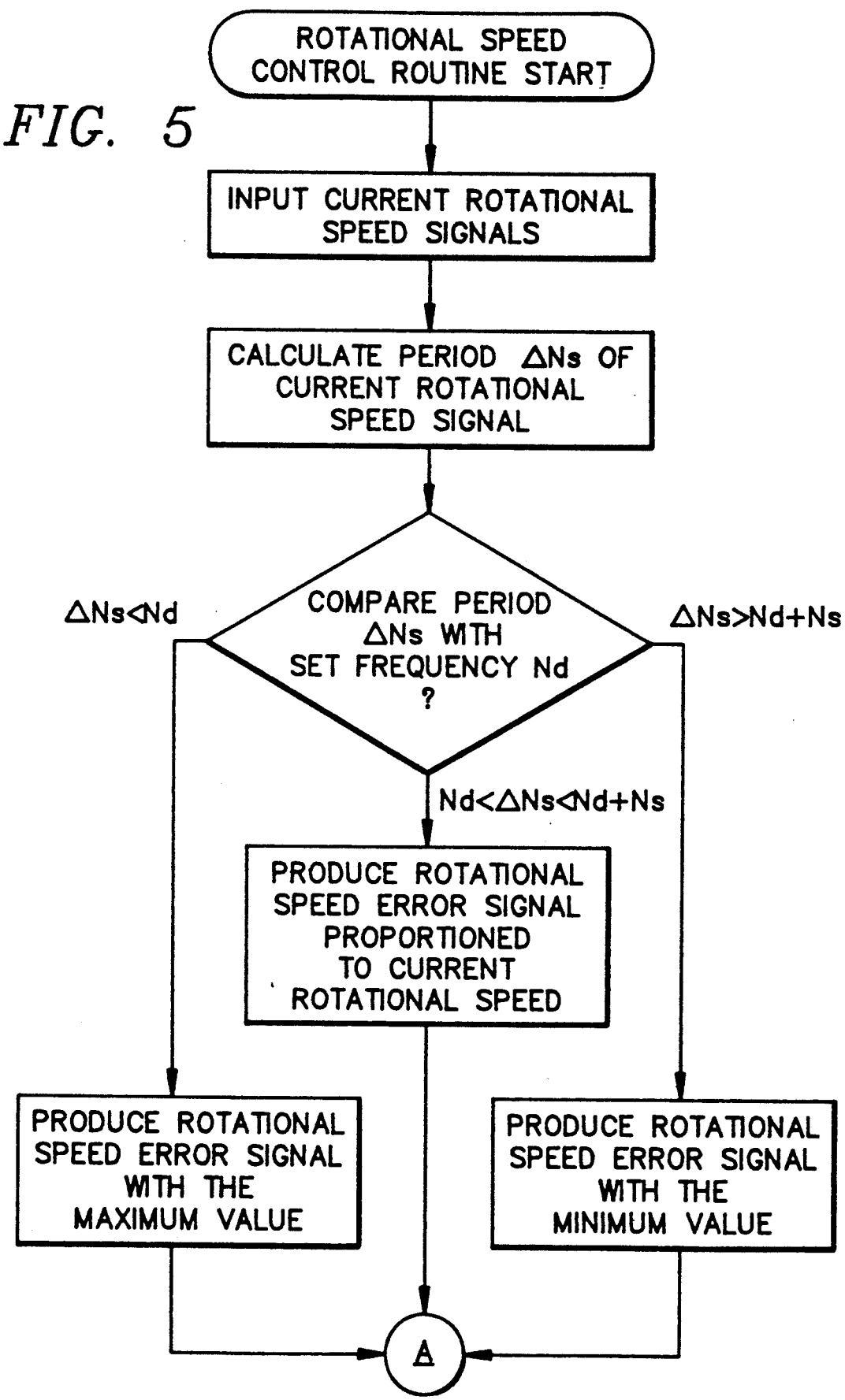
FIGS. 5 and 5a show a flowchart illustrating a rotational speed control routine according to the present invention.
Figure 5A:
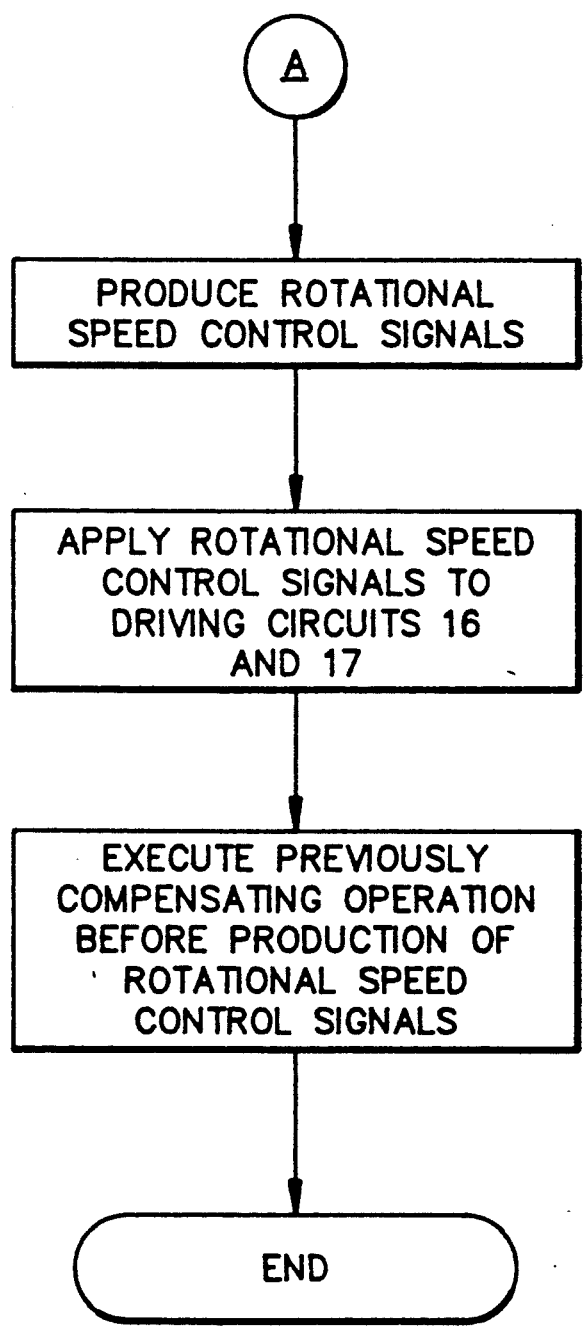

Turning now to FIGS. 5 and 5a which are a flow-chart illustrating the rotational speed control routine according to the present invention, first, the rotational speed control signals are produced by calculating the periods of the detected signals corresponding to the current rotational speeds of the drum motor and the capstan motor, and comparing the calculated periods with the set frequency limits Nd and Nd+Ns. These rotational speed control signals are applied to first and second driving circuits 16 and 17, respectively, to control the rotational speeds of the capstan motor and the drum motor. Herein, an adequate compensating operation necessary to the servo system is previously executed before the production of the rotational speed control signals. This means that no time lag from the production of the subsequent rotational speed control signals makes possible a real time control. Count values necessary to the compensating operation may be varied in accordance with various playback modes, and modified into desired values for enhancing the performance of the system as well.

Next, the procedure controlling the phases of capstan motor 9 and drum motor 3 will be described in detail.

Figure 4:
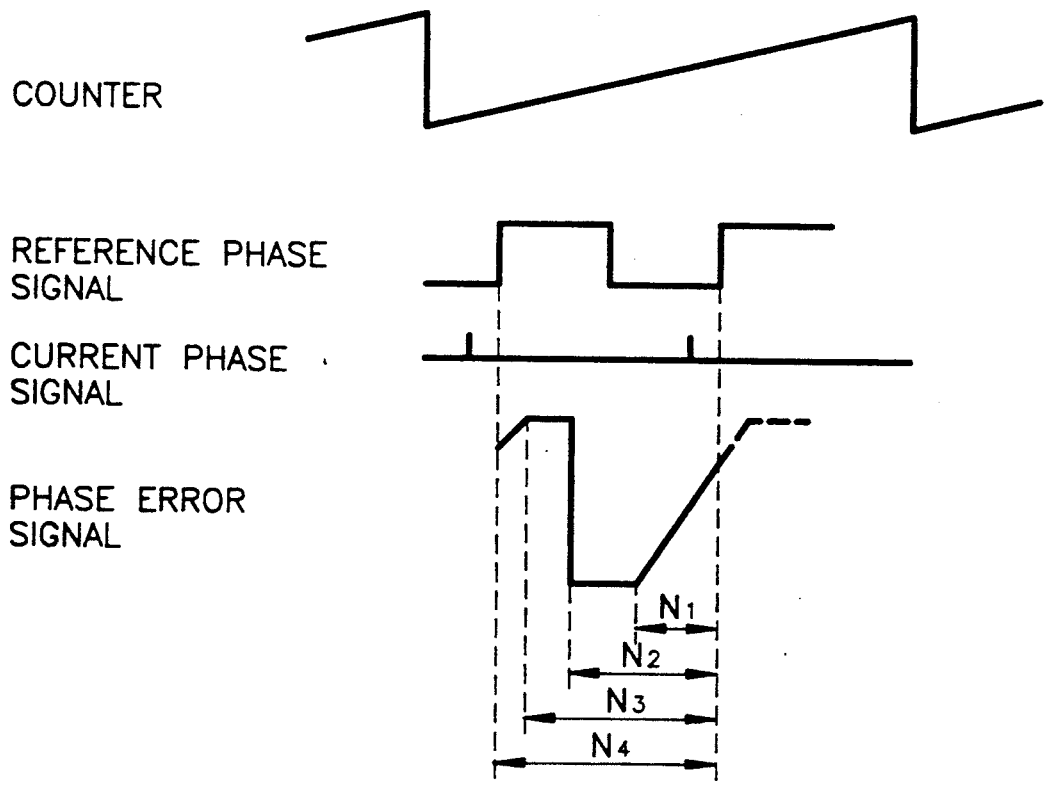
FIG. 4 shows system operation waveforms under the control of the phase according to the present invention.

Referring to FIG. 4 which shows waveforms from respective components in FIG. 2 for the control of the phases, a phase error is generated such that the current phase signals detected by pulse generating head 6 and control head 8 can be in a constant phase relationship with the set reference phase signals. Namely, the phase error signal corresponding to the previously set phase difference limits is generated by calculating phase differences between the reference phase signals and the current phase signals. In FIG. 4, the set phase difference limits are represented as N1, N2, N3 and N4. These values may be set in every way in accordance with various playback modes.

Figure 6:
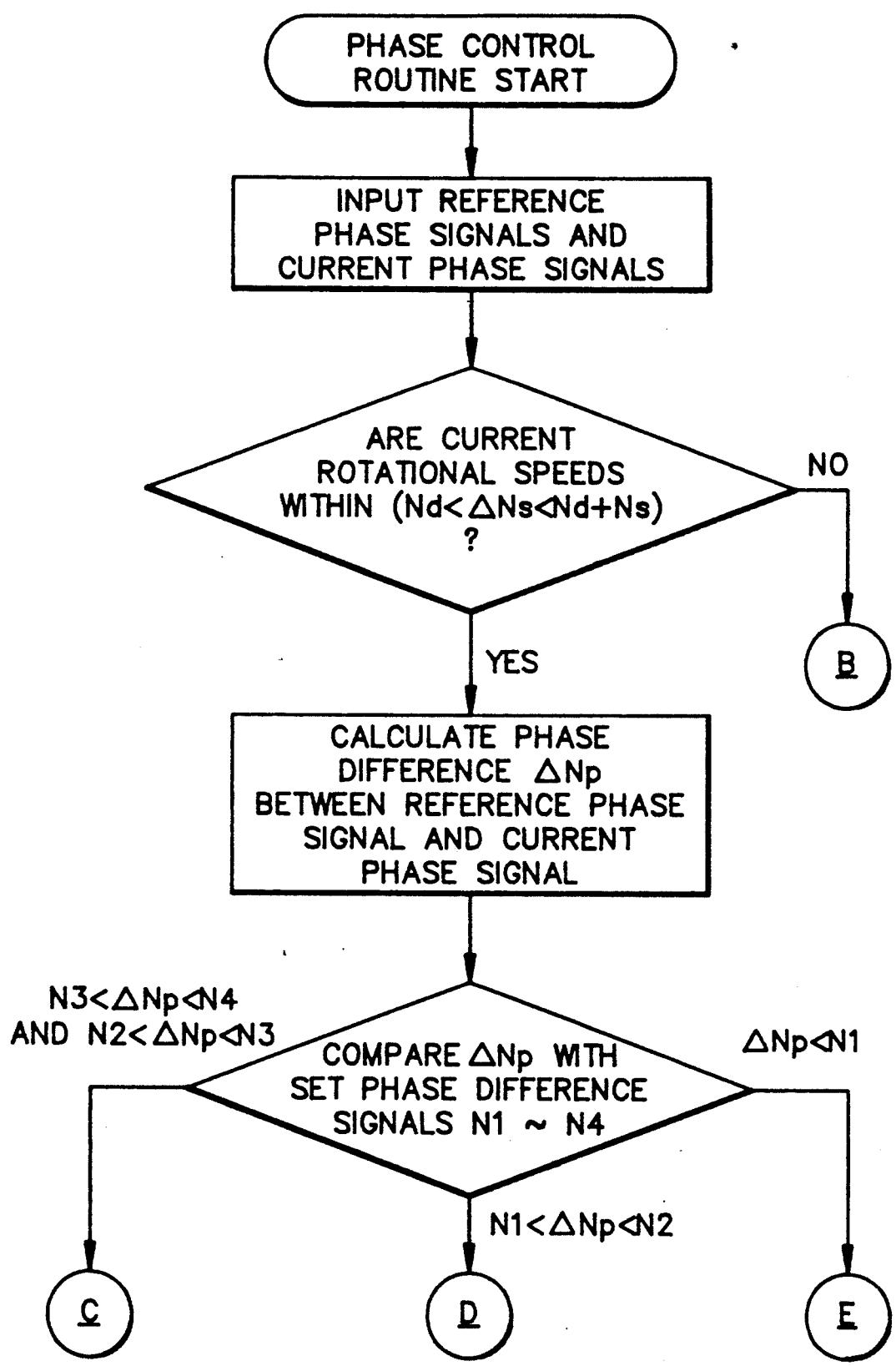
FIGS. 6 and 6a show a flowchart illustrating a phase control routine according to the present invention.
Figure 6A:
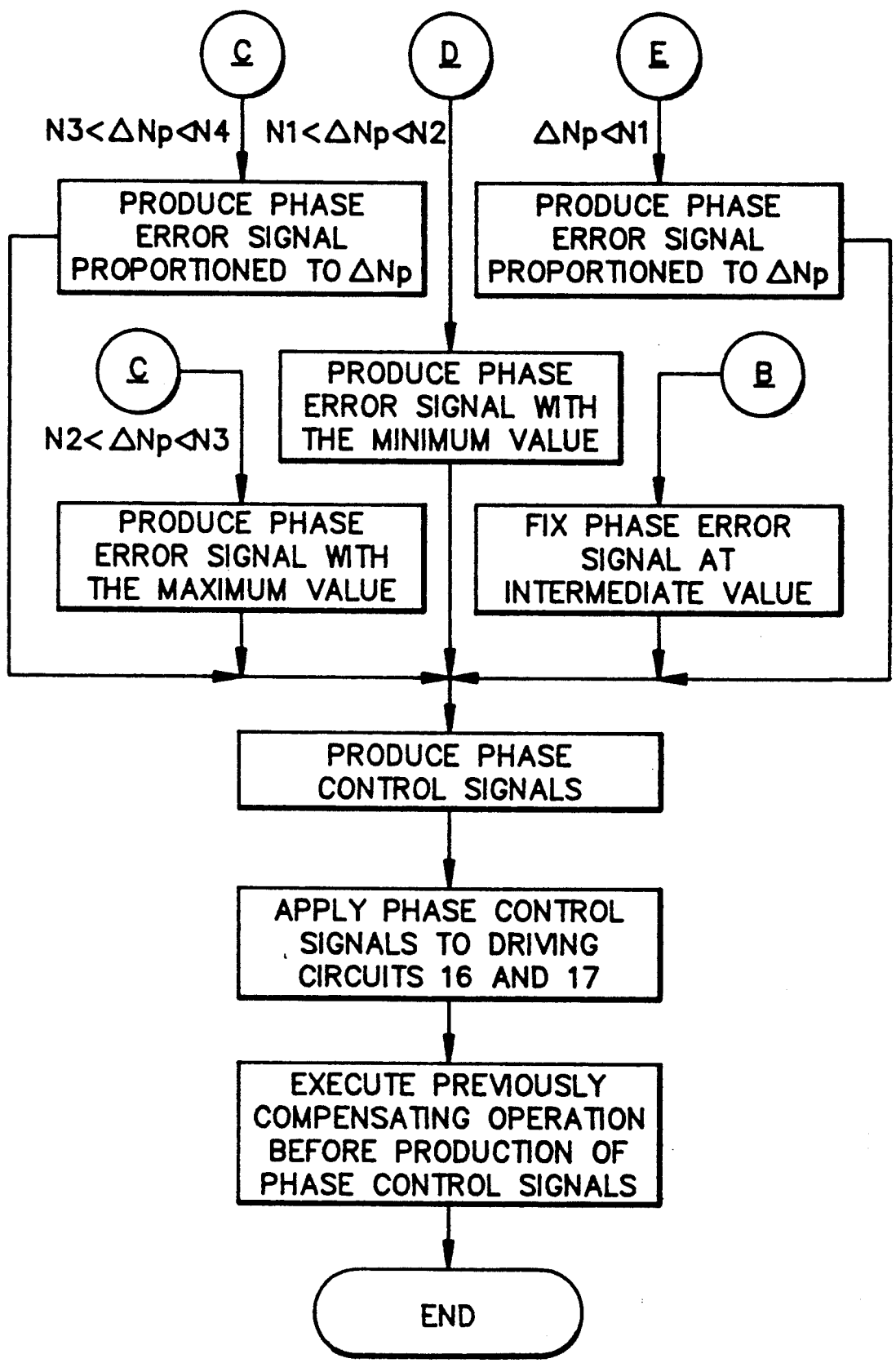

Turning now to FIGS. 6 and 6a which are a flowchart illustrating the phase control routine according to the present invention, before the phase controlling procedure is performed, it is first checked for whether the rotational speeds of drum motor 3 and capstan motor 9 are within the set reference rotational speed limits. If the rotational speeds of the drum motor and the capstan motor are within the set reference rotational speed limits, the phase controlling procedure is performed; if not so, an algorithm for fixing the phase error signal at a constant value is provided.

This means that the phase control when the rotational speeds of the drum motor and the capstan motor are beyond the set reference rotational speed limits is not significant. That is, when the rotational speeds of the drum motor and the capstan motor are beyond the set reference rotational speed limits, the phase error signal is fixed at a constant value; when the rotational speeds of the drum motor and the capstan motor are within the set reference rotational speed limits, the phase control causes the phases of the motors 3 and 9 to be faster.

When the rotational speeds of the drum motor and the capstan motor are within the set reference rotational speed limits, the phase control that is performed is as follows. Phase control signals are produced by calculating phase differences between the reference phase signals and the current phase signals, comparing the calculated phase differences with a plurality of set phase difference signals, and then applying signals to first and second driving circuits 16, 17 (FIG. 2) to control phase of drum motor 3 and capstan motor 9.

An adequate compensating operation necessary to the servo system is previously executed before the production of the phase control signals in a similar manner to that of the rotational speed control. This means that no time lag from the production of the subsequent phase control signals makes possible a real time control. Count values necessary to the compensating operation may be varied in accordance with various playback modes, and modified into desired values for enhancing the performance of the system as well.

As hereinbefore described, in accordance with the present invention, the servo system is capable of embodying software functions of the phase error detector, the rotational speed error detector and the compensating circuit in the conventional construction. Therefore, the servo system in accordance with the present method can obtain superior performance over that of the conventional servo system which is constructed based almost solely on hardware considerations. In addition, such software construction considerations result in the compaction of the servo system, and its lower manufacturing cost as well.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a servo system for detecting signals corresponding to current rotational speeds and phases of a drum motor and a capstan motor in a VCR respectively, and controlling phases of the drum motor and capstan motor by using the detected signals, a method of controlling the phases of the drum motor and the capstan motor in the VCR applying a rotational speed control routine comprising the steps of:

(a) inputting set reference phase signals and current phase signals corresponding to the current phases of said drum motor and said capstan motor, respectively;

(b) checking whether said current rotational speeds of said drum motor and said capstan motor are within set reference rotational speed limits;

(c1) if said current rotational speeds of said drum motor and said capstan motor are within said set reference rotational speed limits, outputting a set constant phase error signal; and if said current rotational speeds of said drum motor and said capstan motor are within said set reference rotational speed limits, performing the following steps of a phase control routine:
  (i) obtaining phase differences in the form of phase difference signals between said set reference phase signals and current phase signals,
  (ii) checking that the phase difference signals correspond to one of a plurality of set phase difference signal limits, and
  (iii) outputting a phase error signal in accordance with the checked results; and
(d) producing phase control signals corresponding to said phase error signals, applying the produced phase control signals to said drum motor and said capstan motor to control their phases, performing a compensating operation necessary to said servo system, and then completing said phase control routine.

2. A method of controlling the phases of a drum motor and a capstan motor in a VCR as set forth in claim 1, wherein said set phase difference signal limits are N1, N2, N3 and N4, with $N1 < N2 < N3 < N4$, and said obtained phase difference signal is $\Delta Np$, the step (c) including the additional steps of:
  producing said phase error signal proportional to said obtained phase difference signal if $N3 < \Delta N < N4$, or $\Delta Np < N1$;
  producing said phase error signal with a maximum value if $N2 < \Delta Np < N3$; and
  producing said phase error signal with a minimum value if $N1 < \Delta Np < N2$.

3. A method of controlling rotational speeds of a drum motor and a capstan motor in a servo system of a VCR by applying a rotational speed control routine comprising the steps of:
  (a) inputting current rotational speed signals corresponding to the current rotational speeds of said drum motor and said capstan motor;
  (b) comparing said current rotational speed signals with a reference signal and checking to determine which of a plurality of predetermined rotational speed regions said current rotational speeds of said drum motor and said capstan motor correspond to, and outputting a rotational speed error signal in accordance with the determined results; and
  (c) producing rotational speed control signals corresponding to said rotational speed error signal, applying the produced rotational speed control signals to said drum motor and said capstan motor to control their rotational speeds, performing a compensating operation necessary to said servo system, then completing said rotational speed control routine.

4. A method of controlling the rotational speeds of the drum motor and the capstan motor in a servo system of the VCR as set forth in claim 3, wherein said predetermined rotational speed regions are defined by reference periods Nd and Ns+Nd, where $Nd < Ns+Nd$, of rotational speed signals, and where a detected period of said current rotational speed signal is $\Delta Ns$, the step (b) includes the additional steps of:
  producing said rotational speed error signal with a maximum value if $\Delta Ns < Nd$;
  producing said rotational speed error signal proportioned to said current rotational speed if $Nd < \Delta Ns < Nd+Ns$; and
  producing said rotational speed error signal with a minimum value if $\Delta Ns > Nd+Ns$.

5. A method of controlling rotational speeds of a drum motor and a capstan motor in a servo system of a VCR by applying a rotational speed control routine comprising the steps of:
  (a) inputting current rotational speed signals corresponding to the current rotational speeds of said drum motor and said capstan motor;
  (b) comparing said current rotational speed signals with a reference signal and checking to determine which of a plurality of predetermined rotational speed regions said current rotational speeds of said drum motor and said capstan motor correspond to, and outputting a rotational speed error signal in accordance with the determined results; and
  (c) producing rotational speed control signals corresponding to said rotational speed error signal, applying the produced rotational speed control signals to said drum motor and said capstan motor to control their rotational speeds, performing a compensating operation necessary to said servo system, then completing said rotational speed control routine;
  wherein if said current rotational speeds of said drum motor and said capstan motor are outside of a predetermined region, a set constant phase error signal is output; and if said current rotational speeds of said drum motor and said capstan motor are within said predetermined region, the following steps of a phase control routine are performed:
    (i) inputting set reference phase signals and current phase signals corresponding to the current phases of said drum motor and said capstan motor, respectively;
    (ii) obtaining phase differences in the form of phase different signals between said set reference phase signals and current phase signals,
    (iii) checking that the phase difference signals correspond to one of a plurality of set phase difference signal limits,
    (iv) outputting a phase error signal in accordance with the checked results, and
    (v) producing phase control signals corresponding to said phase error signals, applying the produced phase control signals to said drum motor and said capstan motor to control their phases, and performing a compensating operation necessary to said servo system.

* * * * *